Patented Sept. 23, 1947

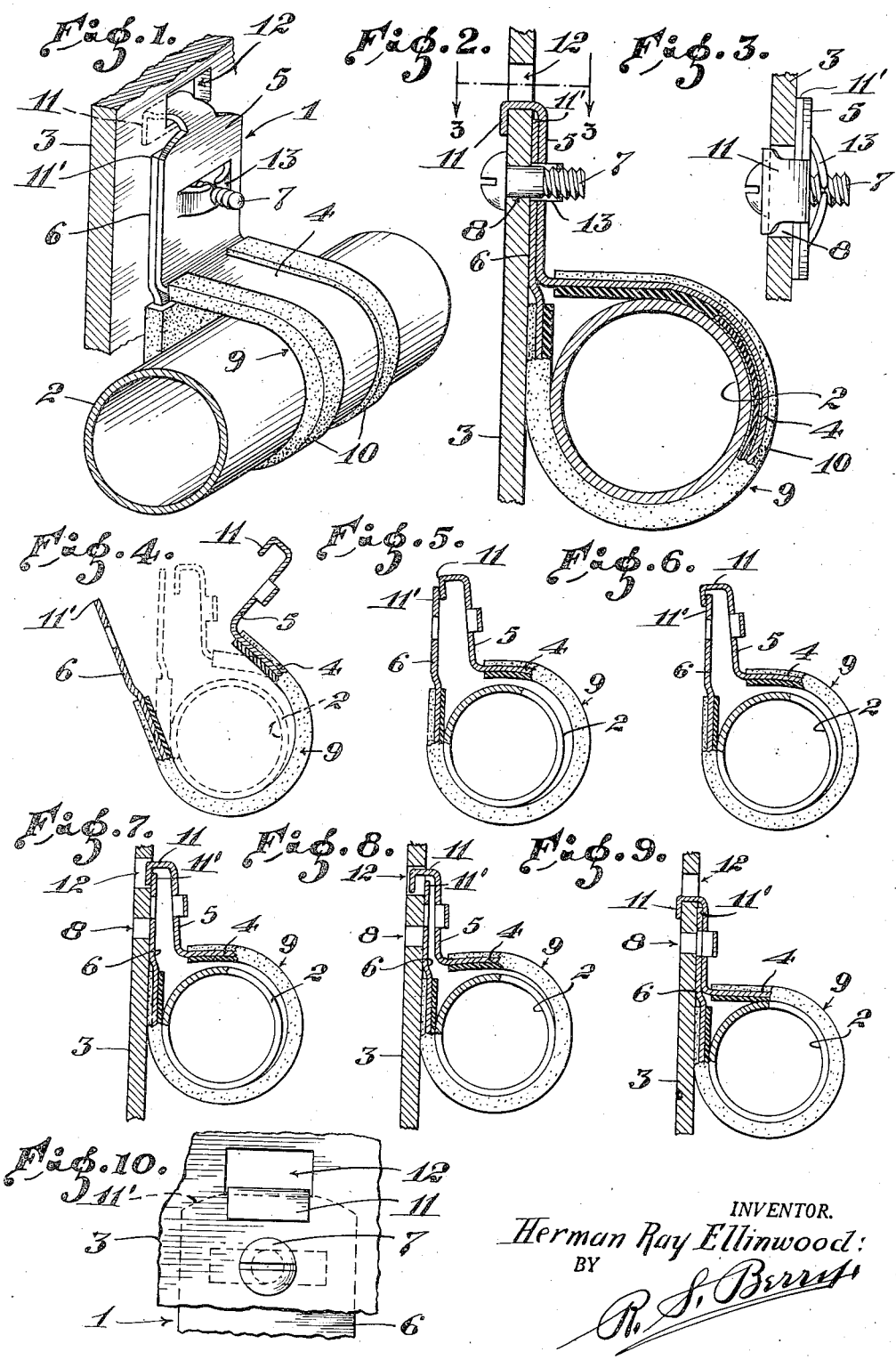

2,427,770

UNITED STATES PATENT OFFICE 2,427,770

SNAP CLIP

Herman Ray Ellinwood, Burbank, Calif., assignor to Adel Precision Products Corp., a corporation of California Original application November 26, 1941, Serial No. 420,577. Divided and this application March 21, 1944, Serial No. 527,438

3 Claims. (Cl. 248—74)

This invention relates to clips for supporting conduits or wires in aircraft and the present application is a division of my pending application for United States Letters Patent, Serial No. 420,577, now Patent No. 2,379,893, filed November 26, 1941, for Conduit clip and securing means.

An object of this invention is to provide a snap clip of the character described which may be quickly and easily snapped around a conduit or wire so that it will remain in the desired position thereon to facilitate installation of the clip on a support therefor.

Another object of my invention is to provide a clip such as described in which a hook means embodied in apertured ends of the clip makes it possible to effect a quick temporary clamping or fastening of the clip around the object to be supported thereby with said ends held in opposed relation and the apertures therein disposed in registration with one another for reception of a fastening by means of which the clip is tightly clamped on the object and secured to a support therefor.

A further object of my invention is to provide a clip of the character described in which the apertured ends of the object-embracing strap when brought together in closing the strap around the object will be hooked together with a snap action so that the apertures in said ends will be aligned for reception of a fastening.

Another object is to provide a clip of the character described wherein the hook which holds the apertured ends together preliminary to applying the fastening, may be used to hook the clip to the support so that the apertures in said ends will be aligned with a fastening-receiving opening in the support to facilitate the application of said fastening to complete the installation of the clip.

Yet another object is to provide a clip of the character described in which a spring nut is carried on one of the apertured ends of the clip so that when the hook member on one of said ends is applied to the support for the clip to temporarily hold it thereon, the opening in the spring nut and the apertures in said ends are aligned with the fastening-receiving opening in the support thereby making for a quick and easy application of the fastening to complete the installation of the clip.

A further object is to provide a clip in which the hook means and nut are integral parts of a single piece of resilient strap metal and are readily and easily formed thereon, thereby eliminating separate and extraneous parts, the fastening such as a screw or bolt being the only extra or "separate" part necessary for a complete installation.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a perspective view of a clip installation embodying my invention;

Fig. 2 is a fragmentary part side elevation and part sectional view of the clip as shown in Fig. 1;

Fig. 3 is a fragmentary sectional view taken on the line 3—3 of Fig. 2;

Fig. 4 is a fragmentary side elevation and part sectional view of the clip showing in full lines the normal position thereof before application to an object to be supported and indicating by the dashed lines how the ends of the clip are brought together when the clip is first applied to the object;

Fig. 5 is a view similar to Fig. 4 showing the ends of the clip when brought into contact with one another and indicating how the hook elements ride one past the other;

Fig. 6 is a view similar to Figs. 4 and 5 showing the ends of the clip hooked together with the apertures therein aligned and the clip temporarily held or clamped on the object;

Fig. 7 is a view similar to Fig. 6 showing how the clip is applied to the support in order to be hooked thereto;

Fig. 8 is a view similar to Fig. 6 showing how the hook is passed through an opening preliminary to being hooked to an edge thereof;

Fig. 9 similar to Fig. 8 is a view showing the clip hooked to the support with the apertures in the ends of the clip, the nut and the fastening-receiving apertures in the support in registration for reception of the fastening;

Fig. 10 is a fragmentary elevational view of the installation shown in Fig. 9.

Referring to the drawing more specifically, 1 designates a clip embodying my invention, 2 represents a conduit line which may of course be a group of wires or other object subject to support, and 3 designates a support on which the clip is installed.

As here provided the clip includes a strap 4 of spring steel or other resilient metal shaped normally as shown in full lines in Fig. 4 so that it is in the form of an open loop subject to being readily positioned to embrace the conduit 2 or wires or other object to be supported thereby, and having apertured and outwardly extended ends 5 and 6 adapted to be brought together to clamp the clip on the object and dispose said ends so that a fastening such as the screw 7 may be inserted through an opening 8 in the support 3 and through the apertures in said ends, to install the clip as shown in Figs. 1, 2 and 3.

A cushion 9 of insulation and yieldable material such as rubber or synthetic rubber is mounted on the loop portion of the strap 4 to cushion and prevent chafing and undue wear of the object supported in the clip. This cushion has angular marginal flaps or flanges 10 arranged to engage the longitudinal side edge and outer face of the strap to hold the cushion in place.

As here provided the apertured ends 5 and 6 are disposed so that when forced from position shown in full lines in Fig. 4 to contacting position shown in Fig. 5, while the strap embraces the conduit or other object, the strap will encircle the conduit and said ends will be near a position of parallelism with the apertures therein nearly in registration with one another.

In accordance with this invention the end 5 of the strap is bent over and inwardly toward the body of the clip to form a hook 11 adapted to hook over the end or lip portion afforded by the upper edge 11' of the end 6 of the strap. Thus when the hook 11 is brought into contact with the end 6 as shown in Fig. 5 and the operator forces said ends together the hook 11 will ride upwardly or "cam over" the lip edge 11' while the latter rides under the hook, with a sharp action and said ends will be hooked together as shown in Fig. 6 with the apertures therein aligned for reception of the screw 7.

The hook means holds the clip in desired position on the object in a sub-assembly, with the clip ready for installation on the support thereby greatly facilitating a quick and easy installation of the clip and object supported thereby.

The installation of the clip hereof is further facilitated by making the hook of such size and form that in addition to holding the clip temporarily in position on the conduit wires or object, it may be applied through an opening 12 in the support 3 or to an edge of the support to "hook"' and hold the clip in position to completely install it.

Figs. 7 and 8 show the progressive operations which may be easily effected to hook the clip on the support as shown in Figs. 9 and 10, it only being necessary to force it against the support as shown in Figs. 7 and 8 so that the hook will pass through the opening 12 and snap over the edge of the opening as shown in Figs. 9 and 10. The opening 12 is registered with apertures in the ends 5 and 6 for a ready insertion of the screw 7.

To render the final installation easier and save time, the end 5 of the strap has two spring tongues 13 struck out from opposite sides of the aperture therein to form a spring nut wherein the ends of said tongues engage opposite sides of the screw 7 under tension and the screw cuts into said ends wherefor the tongues are tensioned and serve as a nut to hold the screw in place. When the screw 7 is tightened, the installation is completed and appears as shown in Figs. 1, 2, and 3 the clip being tightly clamped on the conduit or object and securely fastened to the support.

I claim:

1. In a clip for supporting an object, a resilient strap formed with an open loop portion adapted to embrace the object to be supported and having normally spaced apart apertured ends extending outwardly from said loop portion and adapted to be brought together to clamp the clip on the object, and a hook on one of said ends adapted to hook over an edge of the other of said ends when said ends are brought together, to clamp the clip on the object and hold said ends with the apertures therein in registration for reception of a fastening, said hook serving additionally as a means for aligning said registered apertures with a fastening receiving aperture in a supporting structure.

2. In a clip for supporting an object, a resilient strap formed with an open loop portion adapted to embrace the object to be supported and having normally spaced apart apertured ends extending outwardly from said loop portion and adapted to be brought together to clamp the clip on the object, and a hook on one of said ends adapted to hook over an edge of the other of said ends with a snap action when said ends are brought together, to clamp the clip on the object and hold said ends with the apertures therein in registration for reception of a fastening, said hook having an extent such that without unhooking said ends, it may be hooked over an edge of a support to hold the clip thereon with the apertures in said ends still in registration for reception of the fastening.

3. In a clip for supporting an object, a resilient strap formed with an open loop portion adapted to embrace the object to be supported and having normally spaced apart apertured ends extending outwardly from said loop portion and adapted to be brought together to clamp the clip on the object, and a hook on one of said ends adapted to hook over an edge of the other of said ends with a snap action when said ends are brought together, to clamp the clip on the object and hold said ends with the apertures therein in registration for reception of a fastening, said hook having an extent such that without unhooking said ends, it may be hooked over an edge of a support to effect alignment of a fastening receiving opening in said support with the aligned apertures in the ends of said clip.

HERMAN RAY ELLINWOOD.

REFERENCES CITED

The following references are of record in the file of this patent:

UNITED STATES PATENTS

| Number | Name | Date |
| --- | --- | --- |
| 2,339,093 | Metheny | Jan. 11, 1944 |

OTHER REFERENCES

Publication of Tinnerman Products Inc., in Steel, on April 27, 1942; pages 98 to 100 on Harness Clamp 3044.